United States Patent [19]

Yamada et al.

[11] Patent Number: 4,621,913

[45] Date of Patent: Nov. 11, 1986

[54] MICROSCOPE WITH PROJECTOR

[75] Inventors: Masaharu Yamada; Iseo Konno, both of Tokyo, Japan

[73] Assignees: Kabushiki Kaisha Yamada Kohgaku Seisakusho; Shin Nihon Tsusho Kabushiki Kaisha, both of Tokyo, Japan

[21] Appl. No.: 695,208

[22] Filed: Jan. 25, 1985

[30] Foreign Application Priority Data

Sep. 10, 1984 [JP] Japan .................. 59-136856[U]

[51] Int. Cl.⁴ ...................... G02B 21/18; G02B 21/36
[52] U.S. Cl. ..................................... 353/39; 353/71; 353/78; 353/99; 350/508; 350/511
[58] Field of Search ............. 350/508, 507, 511, 576, 350/445, 502; 353/39, 77, 78, 71, 98, 99

[56] References Cited

U.S. PATENT DOCUMENTS

| 1,601,864 | 10/1926 | Leroux | 350/508 |
| 2,401,224 | 5/1946 | Burton | 350/508 |
| 2,518,240 | 8/1950 | Lowber et al. | 350/508 |
| 3,360,641 | 12/1967 | Korte | 350/523 |
| 4,206,966 | 6/1980 | Tyson et al. | 350/508 |
| 4,444,475 | 4/1984 | Yamada | 350/508 |

FOREIGN PATENT DOCUMENTS

| 718642 | 2/1942 | Fed. Rep. of Germany | 353/98 |
| 1198584 | 8/1965 | Fed. Rep. of Germany | 350/508 |
| 2418421 | 11/1974 | Fed. Rep. of Germany | 353/71 |
| 936054 | 7/1948 | France | 353/71 |
| 1099858 | 9/1955 | France | 350/508 |

Primary Examiner—Jon W. Henry

[57] ABSTRACT

A microscope with a projector, comprising in combination: a mirror guiding skylight into the microscope; a lamp as a light source to emit light directly through said reflector into the microscope; a body tube having a fixed reflector and a rotatable mirror instead of eyepiece; a projector window in said body tube below said rotatable mirror; a screen located in the top of said body tube; and a hood used to cover said screen.

3 Claims, 2 Drawing Figures

MICROSCOPE WITH PROJECTOR

BACKGROUND OF THE INVENTION

The present ivention relates to a microscope with a projector, which is capable of projecting directly upon a desk an enlarged image from the body tube via a rotatable mirror. It is often required to sketch enlarged images of say microbes under the microscope.

The conventional projector used with microscopes has drawbacks in that it is difficult to make a precise sketch of an image because the image is once reflected by an external mirror before projection upon a sketch board at the cost of its clarity.

A device according to the principles of the present invention has been developed to eliminate the problem discussed above. It uses a body tube instead of eyepiece, and projects an image upon a sketch board from a projecting window via a rotatable mirror located in the body tube.

BRIEF DESCRIPTION OF THE DRAWINGS

Referring to the drawings showing a preferred embodiment of the present invention by way of example and not limitation, there is shown in FIG. 1 a phantom view of the embodiment where the screen is in use, and in FIG. 2 another phantom view of the embodiment where the rotatable mirror is turned up for the projection of the image on the sketch board.

For the purpose of illustrating the invention, there is shown in the accompanying drawings one form of microscope which is presently preferred; it being understood that the invention is not intended to be limited to the arrangements and instrumentalities shown.

Figure 2:
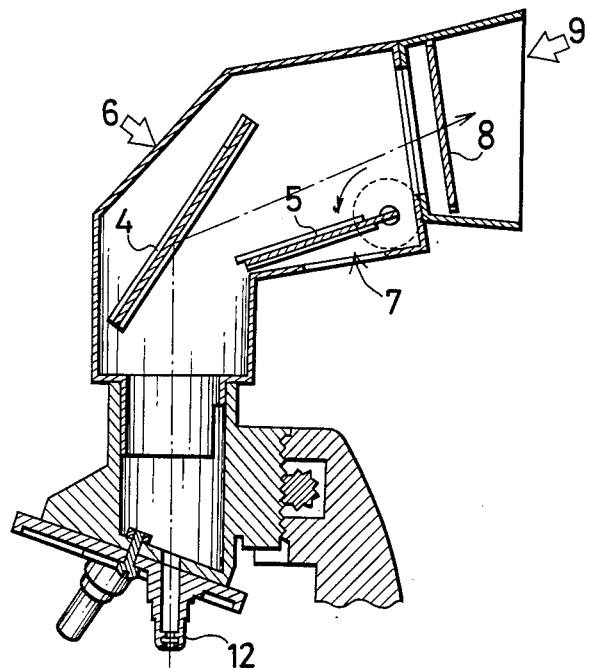

It uses light reflected by a mirror (1) and direct light from a lamp (2) located at said mirror (1). The microscope has a body (3), and a body tube (6) having a fixed reflector (4) and a rotatable mirror (5) therein, is used instead of a conventional eyepiece. A projecting window (7) is located in the lower part of said body tube (6), and a screen (8) is located in the top of said body tube (6), together with a hood (9) to cover said screen (8).

More specifically, the preferred embodiment consists of:

A microscope body (3) has a stage (11) for carrying a preparate (10), a mirror (1) for illuminating a subject applied to said preparate (10), a lamp (2) located at the back of said mirror (1), a revolver (13) having a plurality of object lenses of different diameters arranged concentrically. A projection tube (14) has a plurality of lenses inside. An adjusting handle (15) is provided on the body for moving said projecting tube (14) up and down. A body tube (6) is provided with having a fitting (16) for insertion into the opening which is normally occupied by a conventional eyepiece. The body tube (6) for a fixed reflector (4), a rotatable mirror (5), and a screen (8).

Use of the preferred embodiment is explained below with respect to a case where an image is to be projected upon a sketch board (17) from said projecting window (7) in the lower part of said body tube (6) by adjusting the angle of said rotatable mirror (5).

Turn said lamp (2) located below said stage (11), and turn on the lamp switch to illuminate a test specimen on said preparate (11) mounted on said stage (11) of said microscope body (3). The light passing through the subject is guided into said object lens (12) and then through a plurality of lenses for an enlarged image.

Figure 1:
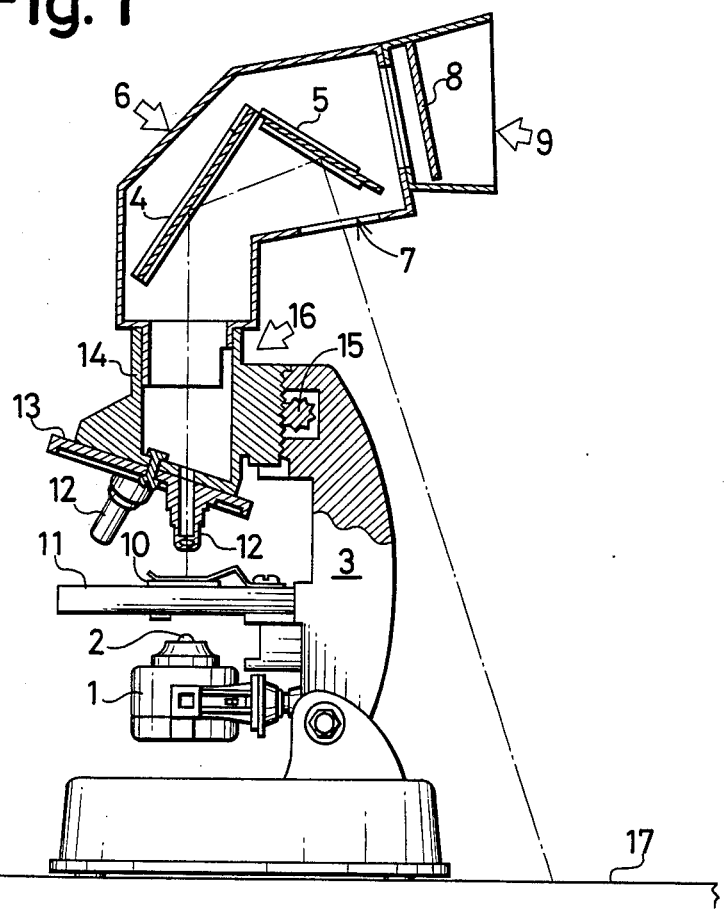

The enlarged image is then reflected by said fixed reflector (4) and said rotatable mirror (5) upon said sketch board (17) via said projecting window (7) in the bottom of said body tube (6) without attenuation of the light. (See FIG. 1) According to the present invention, it is also possible to project the image directly upon said screen (8) located in the top of said body tube (6) and covered with said hood (9) by turning said rotatable mirror (5) as illustrated in FIG. 2 to guide the reflected light from said fixed reflector (4) to said screen (8).

The arrangements and instrumentalities of the projector and microscope according to the present invention bring about the following advantages.

Because the image can be projected directly upon the sketch board (17) from the body tube via the projecting window (7) without attenuation of the light, it is clear and bright enough to be sketched in detail. As the image can also be projected upon the sketch board, it can be observed by several persons at a time. This is particularly useful and efficient for group study at school or the like.

What is claimed is:

1. In combination, a microscope having a light source, at least one objective lens and means for receiving an eyepiece and a projector having a body tube with a fixed reflector and a rotatable mirror mounted therein, a projecting window in the body tube disposed below the rotatable mirror, a screen located at the top of the body tube and a fitting which is adapted to mate with the eyepiece receiving means of the microscope, the fixed reflector reflecting light conveyed by said at least one objective lens, said rotatable mirror being movable between a position in which the light reflected from the fixed reflector is directed to said screen and a position in which the light reflected from said fixed reflector is directed through said projecting window.

2. The combination of claim 1, wherein the axis of rotation of said rotatable mirror is disposed orthogonally to the light incident said fixed reflector.

3. The combination of claim 1, wherein the projector includes a hood so as to shade said screen.

* * * * *